B. D. SANDERS.
Nut and Washer.
No. 83,213.
Patented Oct. 20, 1868.
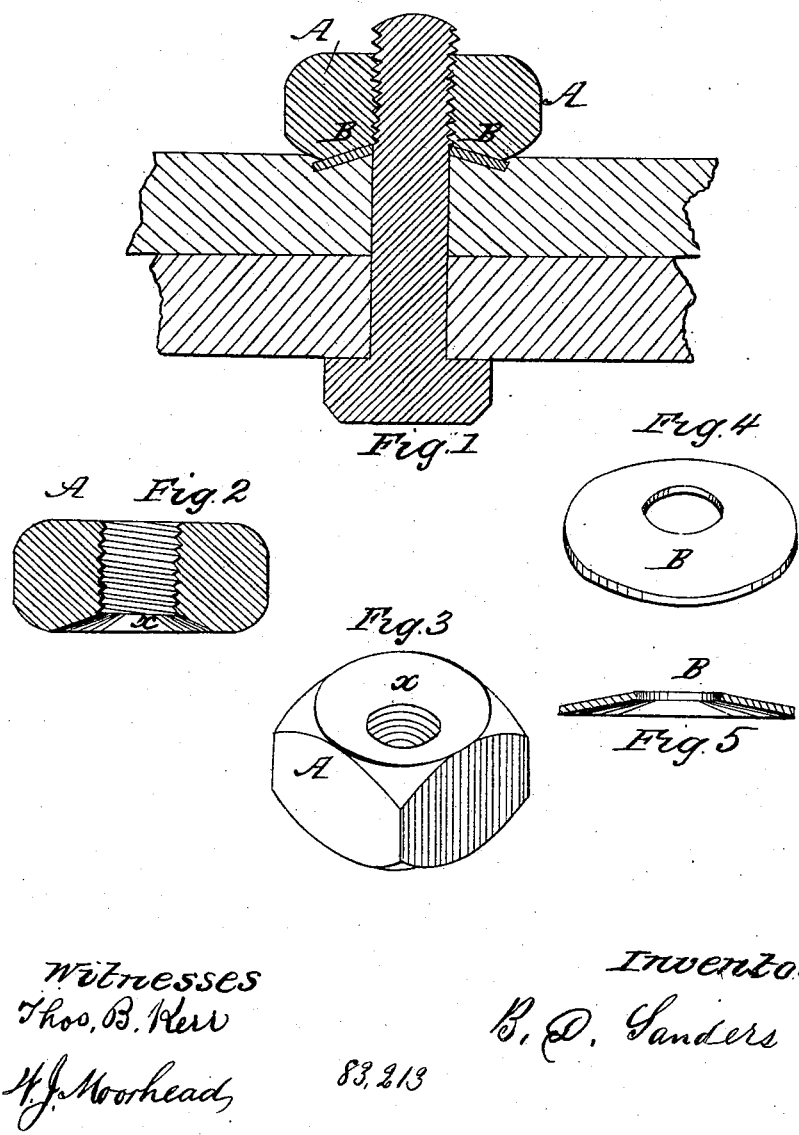

United States Patent Office.

BENJAMIN D. SANDERS, OF WELLSBURG, WEST VIRGINIA.

Letters Patent No. 83,213, dated October 20, 1868.

IMPROVEMENT IN NUTS.

The Schedule referred to in these Letters Patent and making part of the same.

*To all whom it may concern:*

Be it known that I, BENJAMIN D. SANDERS, of Wellsburg, in the county of Brooke, and State of West Virginia, have invented a new and useful Improvement in Nuts and Washers; and I do hereby declare the following to be a full, clear, and exact description thereof, reference being had to the accompanying drawings, in which—

Figure 1 is a sectional view of my improved nut and washer applied to a bolt;

Figure 2 is a sectional representation; and

Figure 3 is a perspective view of my improved nut, showing the concavity on its under face.

Figure 4 is a perspective representation, and

Figure 5 is a sectional view of my improved washer.

Like letters of reference indicate similar parts.

My invention relates to the construction of nuts for screw-bolts, and consists in making nuts with a concavity or depression on the under face, around the eye.

Screw-nuts, as ordinarily made and used, are constructed with a circular collar, bead, or projection, termed a "washer," around the eye or bore, on the under face of the nut, the corners and edges on the under side of the nut being bevelled off or depressed, so that when the nut is screwed down, it may press against the surface on which it is screwed close around the bolt.

The tendency of this is to force away from the bolt and separate the particles of matter composing the object through which the bolt is passed, thus, especially in structures of wood or stone, tending to increase the weakness caused by the bolt-hole.

By my improvement the stress of the nut on the object through which the bolt passes is exerted most strongly in a circle, slightly distant from the bolt, causing a pressure inward towards the bolt, and holding it firmly in place, thus greatly relieving the lateral strain on the bolt.

To enable others skilled in the art to use my improvement, I will proceed to describe more particularly the construction and use of my improved nuts and washers.

In the drawing, A represents a metallic nut, manufactured either by hand or by means of suitably-shaped dies in a machine.

It may be of any required size, and laterally square, hexagonal, or other desired shape, but having on one face, (or on both faces if preferred, so that the nut may be reversed,) a concavity or depression, either conical or curved, around the eye or bore, and extending to or toward the perimeter of the nut.

This depression or concavity is shown at *x* in fig. 2.

Such a nut when used without a washer, (or with the concavo-convex washer or thin plane washer, hereafter described,) when screwed down on its bolt, binds tightly around its outer edge against the object to be secured, and when used for connecting beams, girders, or other articles of wood, the outer edge becomes embedded in the yielding surface, whereby the frictional contact is increased, the fastening is more effective, and the nut is much less liable to work loose.

B represents a metallic washer, of concavo-convex shape, as shown in figs. 3 and 4, each face having any desired radius of curvature, or being conical.

I prefer to make my washers, when designed to be used with my improved nut, of such degree of concavo-convexity, that their upper or convex face shall be somewhat less convex than the concavity of the nut, in order that the edge of the nut may, when screwed down on the washer, bear first upon its upper face, near to its circumference, thereby forcing the washer down into the wooden or other yielding surface to which it is applied, and increasing the convexity of the washer until it fits into the concavity of the nut.

This difference between the convexity of the washer and the concavity of the nut serves, by the springing pressure of the washer on the under surface of the nut, to prevent the loosening of the nut by the alternate swelling and contraction of the wood, or the expansion and contraction of the bolt on which the nut is screwed, and thus serves as a locking-device.

I do not confine my invention to the relative degree of concavity of the nut, and concavo-convexity of the washer, nor to the use, with my improved nut, of any washer, whether concavo-convex or plane, because the nut may be used separately, that is, with a washer of ordinary shape.

My improved nut may also be used with a plane-surfaced washer of metal, so thin as to conform itself, when in use, to the shape of the concavity of the nut, by compression between the nut and the yielding surface against which it is screwed.

My improved nuts will also be found very useful, as applied to metallic surfaces, in machinery where it is desired to protect the eye of the nut or the bolt from moisture, by using a washer of leather, soft metal, or other yielding substance.

Having thus described my improvement,

What I claim as my invention, and desire to secure by Letters Patent, is—

A metallic nut for screw-bolts, having a concave or conical depression in the lower face, around the eye, substantially as and for the purpose described.

In testimony whereof I, the said BENJAMIN D. SANDERS, have hereunto set my hand.

B. D. SANDERS.

Witnesses:
THOS. B. KERR,
R. C. WRENSHALL.